O. W. Minard,
Spinning Metals.
Nº 14,696.     Patented Apr. 15, 1856.
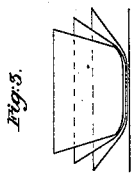
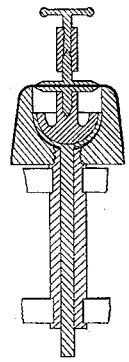
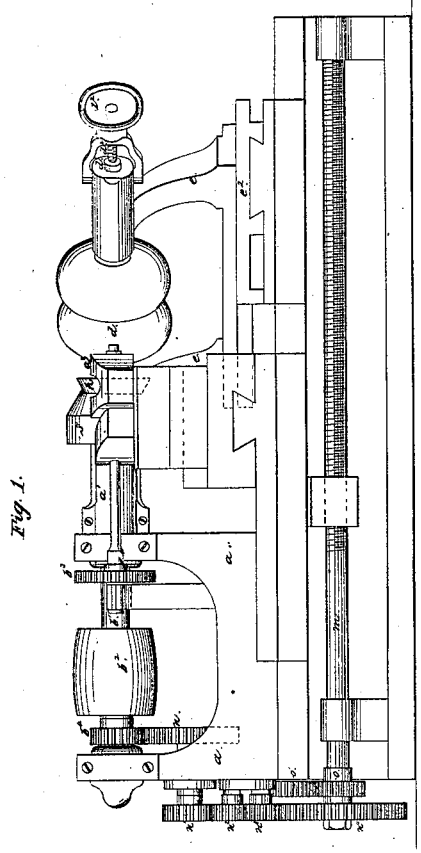
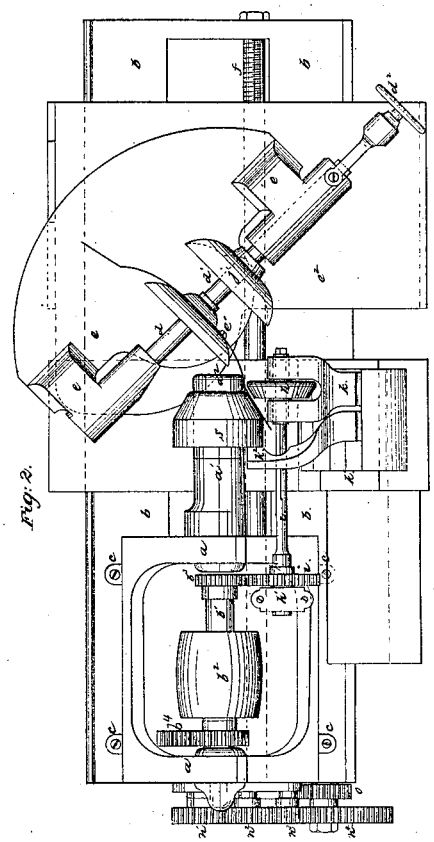
Witnesses:     Inventor
O. W. Minard

UNITED STATES PATENT OFFICE.

O. W. MINARD, OF WATERBURY, CONNECTICUT.

IMPROVEMENT IN MAKING BRASS KETTLES.

Specification forming part of Letters Patent No. 14,696, dated April 15, 1856.

*To all whom it may concern:*

Be it known that I, O. W. MINARD, of Waterbury, in the county of New Haven and State of Connecticut, have invented certain new and useful improvements in the machinery for manufacturing brass kettles and like articles by the process known as "spinning up;" and I do hereby declare the following to be a full, clear, and exact description thereof, reference being had to the accompanying drawings, in which—

Figure 1 is a side elevation. Fig. 2 is a plan. Fig. 3 shows the different stages in the progress from a flat plate to a perfectly-formed kettle. Fig. 4 shows the process of spinning up a kettle on a former with my improvement of holder applied thereto. Fig. 5 shows a cross-section of forming-mandrel and working-roller with a stationary substitute for the sleeve. Fig. 6 shows a varied form of working-mandrel.

My improvements are, first, an independent mandrel or holder to clamp and hold the plate of metal while being operated on by the working mandrel and roller; secondly, employing a small cylinder or other figure on the end of the working-mandrel, either in one piece with said mandrel or attached to it, upon which the article is spun up, instead of employing a set of formers, as heretofore done, for the different stages of the work; thirdly, a sleeve or its equivalent for preventing the crimping of the metal before the working-roller; and, fourthly, the apparatus for giving convexity to the kettle-bottom.

Before my invention was made the most approved method of spinning up kettles was by means of a series of formers gradually approximating the form required from the flat plate. These had to be multiplied according to the number of operations the plate had to be submitted to to complete the article, and in all cases several successive formers were required to perfect the work. With such a device the metal was compelled to revolve, and a narrow-edged working-roller could alone be used, as any other would stretch the metal too much in a lateral direction and cause it to crimp. Consequently a kettle made in this way could not be smoothed on the former by broad-faced rollers, as is done in mine. This, together with the great number of processes required of spinning and annealing to perfect the article and the liability to crimp under the action of the tool, constituted the main difficulties encountered by the old process, causing inequalities in the density of the metal, and other defects, and costing more in the manufacture than by my improved apparatus.

My machine can be used to form any pattern of kettle without shifting the model or working-mandrel throughout the process; and I can finish and smooth the same with fewer annealings than any other process with which I am acquainted.

The construction of this machine is as follows: The head-stock $a$ $a$ is attached to the ways or rails $b$ at its center, so as to be swiveled a little to turn the working-mandrel which runs in it into a somewhat inclined position with the ways. It is firmly affixed, when the machine is in operation, by four bolts, $c$ $c$ $c$ $c$, which pass through oblong mortises to allow the shifting. The front standard of the head-stock $a$ $a$ has a long projecting piece, $a'$, in front, which surrounds and supports the front end of the mandrel about to be described, which has its bearing in it. The working-mandrel $b'$ has a pulley, $b^2$, on it between the standards, and also two spur-pinions, $b^4$ $b^5$. Beyond the projecting journal-bearing $a'$ a working-roll is affixed to or forms a part of the mandrel. It may be of the form shown in Fig. 6; but I prefer a cylindrical form for a straight-sided kettle, as seen in Figs. 1 and 2.

In front of the working-roll $a^2$ is the holding mandrel or mandrels $d$ $d'$, in proper bearings in a frame, $e$, which turns on a point at $e'$, by which it is connected with a sliding frame, $e^2$, which moves along upon the ways by means of the screw $f$, turned as hereinafter described. The plate-holder, consisting of two mandrels in line with each other, grips the plate to be wrought between them. One of these mandrels, $d$, rests with its end against a set-screw in the bearing, its opposite end bearing a disk of a form like what the bottom and corner of the article to be manufactured is to assume. The center portion I prefer to make straight, and on the opposite mandrel end there is a similar small flat piece. This latter mandrel, $d'$, is forced forward toward $d$ by a set-screw, $d^2$, in a bridle turned over it. This mandrel slides back to remove the article when formed. On this mandrel $d'$ there is a disk, $j$, which slides back and forth on it, which is of similar configuration to the disk, being a counterpart to it. This is forced up against the plate by means of a lever, wedge, or screw, or any other mechanical equivalent well known to machinists, and forces the bottom gradually into shape while under the drawing strain of the machine, as will be hereinafter explained. These mandrels may turn freely as the metal is drawn around by the working-rolls, or they may be driven in any convenient way to conform to the motion of said working-rollers. The working-roller $h$, when the work commences, stands opposite the end of the working-mandrel $a^2$, and the holding-mandrels are brought into such a position as to bring the plate to be wrought between said roller $h$ and the end of the working-mandrel $a^2$. The working-roller $h$ is on a shaft, $i$, with which it is connected by a feather, so as to slide along said shaft as the holding-rest $k$, in which it is supported, is moved along. The shaft $i$ is turned by a pinion, $i'$, on it, which gears into pinion $b^3$ on mandrel $b'$. The holding-rest at the point where the roller $h$ is is made to slide toward and from the roll $a^2$ upon the base $k'$, which has a motion along the ways $b$. The end of the shaft $h$ at the pinion $i'$ is in a swiveling bearing, $h'$, which keeps the pinion in gear. The rest $k\,k'$ is moved along the ways toward the head-stock $a\,a$ by a screw, $m$, below. This screw is moved by the gearing $n\,n'\,n^2\,n^3\,n^4$, connecting it with pinion $b^4$, while pinions $o\,o'$ connect this screw $m$ with screw $f$, before named, turning it much slower, so that while the holding-rest moves along the roll $a^2$ the mandrels and plate gradually move off a short distance from the end thereof. This movement has the effect to prevent a pressure and chafing at one point where the end of the roll $a^2$ bears, and also aids in drawing the bottom into shape and aiding the action of the disk $j$ in bringing it into shape smoothly. The bottom could not be formed up by the pressure of disk $j$ alone without crimping; but by the combined action of drawing and pressing up the purpose of perfectly forming the bottom is effected without rolling or reducing the thickness of the plate in this part where thickness and strength are required. On the roll $a^2$ there is a loose sleeve, $s$, one edge of which next to the working-roller $h$ is chamfered off to a similar bevel with the roll. This holds out that part of the plate to be wrought in front of the roll smoothly and prevents its crimping. This is of great importance, and can be effected by a stationary piece, instead of the sleeve, as shown in Fig. 5. In fact, anything placed between roll $a^2$ and the working-roller $h$ that will hold out the plate there will do as a more or less perfect equivalent of my device.

It will be noticed that the roll $a^2$ bears upon the wrought plate nearly the whole length from the bottom outward during the whole process of manufacture. Another and separate bearing may be substituted therefor in cases when such a roll as is seen in Fig. 6 is used, which would obviously be a substitute for this very important support, as I find by experience that a kettle cannot be made without this support so perfectly and rapidly as with it.

In my machine the parts are so arranged as to support all parts of the plate while manufacturing the kettle. The mandrels for holding the plate are turned as fast as it is curved up, and each part is readily adjusted and adapted to the purpose intended.

Having thus fully described my improved machinery for spinning up brass kettles and other similar articles, what I claim therein as new, and for which I desire to secure Letters Patent, is—

1. The employment of the clamps or holder, in combination with the working-rollers for drawing or working, or their equivalents, all arranged, adjusted, and operating substantially in the manner described, for the purpose of forming a disk of metal into a kettle, as specified, without employing a mold or former therefor.

2. The combination of the center piece, $d'$, for holding the disk of metal, and disk $j$, by which the bottom of the article being manufactured is formed by the combined action of the disk $j$ and drawing or working apparatus, as set forth.

O. W. MINARD.

Witnesses:
WM. H. BISHOP,
ANDREW DE LACY.